(12) United States Patent
Wilson

(10) Patent No.: US 8,994,345 B2
(45) Date of Patent: Mar. 31, 2015

(54) CONTROL OF MULTI-LEVEL SUPPLY STAGE

(75) Inventor: Martin Paul Wilson, Cambourne (GB)

(73) Assignee: Nujira Limited (GB)

( * ) Notice: Subject to any disclaimer, the term of this patent is extended or adjusted under 35 U.S.C. 154(b) by 733 days.

(21) Appl. No.: 13/144,408

(22) PCT Filed: Jan. 14, 2010

(86) PCT No.: PCT/EP2010/050371
§ 371 (c)(1),
(2), (4) Date: Dec. 7, 2011

(87) PCT Pub. No.: WO2010/081843
PCT Pub. Date: Jul. 22, 2010

(65) Prior Publication Data
US 2012/0105043 A1 May 3, 2012

(30) Foreign Application Priority Data

Jan. 14, 2009 (GB) .................................. 0900573.7

(51) Int. Cl.
*G05F 1/577* (2006.01)
*H02M 3/158* (2006.01)
*H02M 1/00* (2006.01)

(52) U.S. Cl.
CPC ............ *H02M 3/158* (2013.01); *H02M 3/1584* (2013.01); *H02M 3/1588* (2013.01); *H02M 2001/009* (2013.01); *Y02B 70/1466* (2013.01)
USPC ............ 323/267; 323/222; 323/271; 323/283

(58) Field of Classification Search
CPC ... G05F 1/577; H02M 3/1582; H02M 3/1584; H02M 3/1588
USPC .................. 323/222, 267, 271, 282, 283, 284
See application file for complete search history.

(56) References Cited

U.S. PATENT DOCUMENTS 6,437,545 B2 * 8/2002 Sluijs ............................ 323/222
6,522,110 B1 * 2/2003 Ivanov .......................... 323/267
(Continued)

FOREIGN PATENT DOCUMENTS

CN    1716739 A     1/2006
EP    1 895 648 A2  3/2008

OTHER PUBLICATIONS

"PCT Application No. PCT/EP2010/050371 International Preliminary Report on Patentability Jul. 28, 2011", , Publisher: PCT, Published in: PCT.

(Continued)

*Primary Examiner* — Jeffrey Sterrett
(74) *Attorney, Agent, or Firm* — Kaplan Breyer Schwarz & Ottesen, LLP

(57) ABSTRACT

There is described a buck-boost converter comprising: a voltage source; an inductor, wherein a first terminal of the inductor is switchably connected to the voltage source; and a plurality of capacitors switchably connected to a second terminal of the inductor, wherein a respective plurality of output voltages are formed across the plurality of capacitors, further comprising: an error determination means, for determining an error in each of the plurality of voltages, an inner control loop adapted to switchably connect one of the plurality of capacitors to the second terminal of the inductor in dependence on the determined errors; and an outer control loop adapted to control switching between buck mode and boost mode in dependence upon the determined errors.

18 Claims, 7 Drawing Sheets

(56) References Cited

U.S. PATENT DOCUMENTS

| | | |
|---|---|---|
| 6,600,300 B2 * | 7/2003 | Groeneveld et al. .......... 323/282 |
| 2002/0093315 A1 * | 7/2002 | Sluijs ............................ 323/267 |
| 2004/0027104 A1 * | 2/2004 | Ishii et al. ..................... 323/267 |
| 2004/0070376 A1 * | 4/2004 | Hoshino et al. ............... 323/267 |
| 2006/0114624 A1 | 6/2006 | Sharma |
| 2006/0176031 A1 * | 8/2006 | Forman et al. ................ 323/267 |
| 2008/0231115 A1 | 9/2008 | Cho et al. |
| 2012/0043947 A1 * | 2/2012 | Wilson .......................... 323/234 |
| 2012/0105043 A1 * | 5/2012 | Wilson .......................... 323/304 |
| 2013/0127548 A1 * | 5/2013 | Popplewell et al. .......... 330/297 |
| 2013/0154507 A1 * | 6/2013 | Gilliom ......................... 315/297 |
| 2013/0193943 A1 * | 8/2013 | Wilson .......................... 323/284 |
| 2013/0234513 A1 * | 9/2013 | Bayer ............................ 307/31 |

OTHER PUBLICATIONS

Anmol Sharma and Y. Shanthi Pavan, "A Single Inductor Multiple Output Converter with Adaptive Delta Current Mode Control", "International Symposium on Circuits and System", May 24, 2006, pp. 5643-5646, Publisher: IEEE.

"Related Chinese Patent Application No. 2010 80009946.4 Office Action", Oct. 29, 2013, Publisher: CIPO, Published in: CN.

* cited by examiner

CONTROL OF MULTI-LEVEL SUPPLY STAGE

BACKGROUND TO THE INVENTION

1. Field of the Invention

The invention is directed to an efficient power management method and apparatus for providing multiple supply voltages from a single voltage source.

2. Description of the Related Art

In modern fourth generation wireless handset solutions, there is an expectation that a power management integrated circuit (PMIC) will generate an array of voltages of different values for powering various blocks, including for example digital cores, inputs/outputs, analogue circuits and power amplification stages. These blocks will have different voltage requirements. The voltages will be required to be generated from a single lithium ion cell having a terminal voltage with a typical value between 2.6V and 5.5V.

In order to provide this a so-called H-bridge buck-boost topology, as illustrated in FIG. 1, is typically provided.

With reference to FIG. 1, there is shown a voltage generation stage 100. A voltage source 110, typically a battery, provides an input voltage on line 112. Switching control elements consist of a buck section 104 formed by switches 102 and 103, and a boost section 109 formed by switches 105 and 106. Capacitor 107 is a capacitive storage element and inductor 108 is an inductive storage element. The voltage source 110 has an exemplary voltage supply of 2.5V. Supply stage 100 has to switch between buck and boost modes to control an output voltage on line 114.

In boost mode, the voltage source 110, typically a battery, has a value which is lower than a desired voltage at the output 114. In buck mode the voltage source 110 has a value which is higher than a desired voltage at the output 114.

A problem with the topology such as illustrated in FIG. 1 is that a separate voltage generation stage 100 must be used for each voltage required to be generated. That is, a voltage generation stage is dedicated to generating one voltage and, and when n voltages are required n voltage generation stages 100 are required. Thus the entire circuit of FIG. 1 must be replicated for each required voltage. This results in a number of buck-boost circuits, and in particular an associated proliferation of inductors. This adds to cost, takes up space, and generates interference.

In order to overcome these problems, in the prior art there has been proposed approaches to improve power management ICs. These approaches include: the provision of on-chip inductors; switched capacitor solutions; and multi-winding transformers.

It has been more recently proposed, in UK patent application number 0808873.4 (Nujira Limited) filed 15 May 2008, to provide a voltage generation apparatus comprising: a voltage source; an inductor, wherein a first terminal of the inductor is switchably connected to the voltage source; and a plurality of capacitors switchably connected to a second terminal of the inductor, wherein a respective plurality of voltages are formed across the plurality of capacitors. Thus using a single inductor, a single set of buck switches, a single set of boost switches, and n capacitors, n supply voltages can be generated.

It is an aim of the invention to provide an improved power management arrangement for the provision of multiple voltage levels for such an arrangement.

SUMMARY OF THE INVENTION

In accordance with the invention there is provided a voltage generation apparatus comprising: a voltage source; an inductor, wherein a first terminal of the inductor is switchably connected to the voltage source; and a plurality of capacitors switchably connected to a second terminal of the inductor, wherein a respective plurality of output voltages are formed across the plurality of capacitors, further comprising: an error determination means, for determining an error in each of the plurality of voltages; and a control means, for switchably connecting one of the plurality of capacitors to the second terminal of the inductor in dependence on the determined errors.

The control means may be adapted to switchably connect the capacitor associated with the one of the plurality of output voltages having the most negative deviation from a mean error.

The voltage generation apparatus may further comprise an error determination means for determining the error deviation of the output voltage formed across each capacitor.

The control means may be adapted to ensure that only one of the plurality of capacitors is connected to the second terminal of the inductor at any time.

The control means may include logic means to generate a plurality of control signals for a switch array for switchably connecting each of the plurality of capacitors to the second terminal of the inductor, wherein if more than one of said control signals is set the control signal for the switch associated with the lowest output voltage is delivered to the switch array.

The voltage generation apparatus may further comprise means for detecting a maximum voltage has been reached for a switchably connected capacitor, and responsive thereto for disconnecting the capacitor.

The voltage generation circuit may further comprise means for monitoring all the capacitors which are not switchably connected, wherein on detection of a voltage associated with any capacitor falling below a minimum allowed error deviation, switchably connecting that capacitor.

A buck-boost converter may include the voltage generation circuit according to any one of claims 1 to 5, and further may include a control means adapted to control the converter to switch between buck and boost operation in dependence on a mean error of the plurality of output voltages formed across the plurality of capacitors.

In another aspect the invention provides a buck-boost converter comprising: a voltage source; an inductor, wherein a first terminal of the inductor is switchably connected to the voltage source; and a plurality of capacitors switchably connected to a second terminal of the inductor, wherein a respective plurality of output voltages are formed across the plurality of capacitors, further comprising: an error determination means, for determining an error in each of the plurality of voltages, an inner control loop adapted to switchably connect one of the plurality of capacitors to the second terminal of the inductor in dependence on the determined errors; and an outer control loop adapted to control switching between buck mode and boost mode in dependence upon the determined errors.

The error determination means may determine an error deviation for each of the plurality of output voltages and a mean error for the plurality of output voltages, wherein the inner control loop is adapted to operate in dependence on the plurality of error deviations and the outer control loop is adapted to operate in dependence upon the mean error.

The inner control loop may be adapted to connect the one of the plurality of capacitors associated with the output voltage having the largest error deviation.

The buck-boost converter may further comprise means for detecting a maximum voltage has been reached for a switchably connected capacitor, and responsive thereto for disconnecting the capacitor.

The buck-boost converter may further comprise means for monitoring all the capacitors which are not switchably connected, and adapted, on detection of a voltage associated with any capacitor falling below a minimum allowed error deviation, to switchably connect that capacitor.

In a further aspect there is provided a method for controlling a voltage generation apparatus comprising: a voltage source; an inductor, wherein a first terminal of the inductor is switchably connected to the voltage source; and a plurality of capacitors switchably connected to a second terminal of the inductor, wherein a respective plurality of output voltages are formed across the plurality of capacitors, the method comprising: determining an error in each of the plurality of voltages; and switchably connecting one of the plurality of capacitors to the second terminal of the inductor in dependence on the determined errors.

The step of switchably connecting may be adapted to switchably connect the capacitor associated with the one of the plurality of output voltages having the most negative error deviation.

The method may further comprise determining the error deviation of the output voltage formed across each capacitor.

The may further comprise ensuring that only one of the plurality of capacitors is connected to the second terminal of the inductor at any time.

The method may further include generating a plurality of control signals for a switch array for switchably connecting each of the plurality of capacitors to the second terminal of the inductor, wherein if more than one of said control signals is set the control signal for the switch associated with the lowest output voltage is delivered to the switch array.

The method may further comprise detecting a maximum voltage has been reached for a switchably connected capacitor, and responsive thereto for disconnecting the capacitor.

The method may further comprise monitoring all the capacitors which are not switchably connected, and, on detection of a voltage associated with any capacitor falling below a minimum allowed error deviation, switchably connecting that capacitor.

The method may control a buck-boost converter and may include the steps of controlling a voltage generation circuit, and further including controlling the converter to switch between buck and boost operation in dependence on a mean error of the plurality of output voltages formed across the plurality of capacitors.

In a further aspect there is provided a method for controlling a buck-boost converter comprising: a voltage source; an inductor, wherein a first terminal of the inductor is switchably connected to the voltage source; and a plurality of capacitors switchably connected to a second terminal of the inductor, wherein a respective plurality of output voltages are formed across the plurality of capacitors, the method comprising: determining an error in each of the plurality of voltages, switchably connecting, under control of an inner control loop, one of the plurality of capacitors to the second terminal of the inductor in dependence on the determined errors; and switching, under control of an outer control loop, between buck mode and boost mode in dependence upon the determined errors.

The method may further comprise determining an error deviation for each of the plurality of output voltages and a mean error for the plurality of output voltages, and operating the inner control loop in dependence on the plurality of error deviations and operating the outer control loop in dependence upon the mean error.

The inner control loop may be adapted to connect the one of the plurality of capacitors associated with the output voltage having the largest error deviation.

The method may further comprise detecting a maximum voltage has been reached for a switchably connected capacitor, and responsive thereto for disconnecting the capacitor.

The method may further comprising monitoring all the capacitors which are not switchably connected, and, on detection of a voltage associated with any capacitor falling below a minimum allowed error deviation, switchably connecting that capacitor.

BRIEF DESCRIPTION OF THE DRAWINGS

The invention will now be described with reference to the accompanying drawings in which.

DESCRIPTION OF THE PREFERRED EMBODIMENTS

Figure 1:
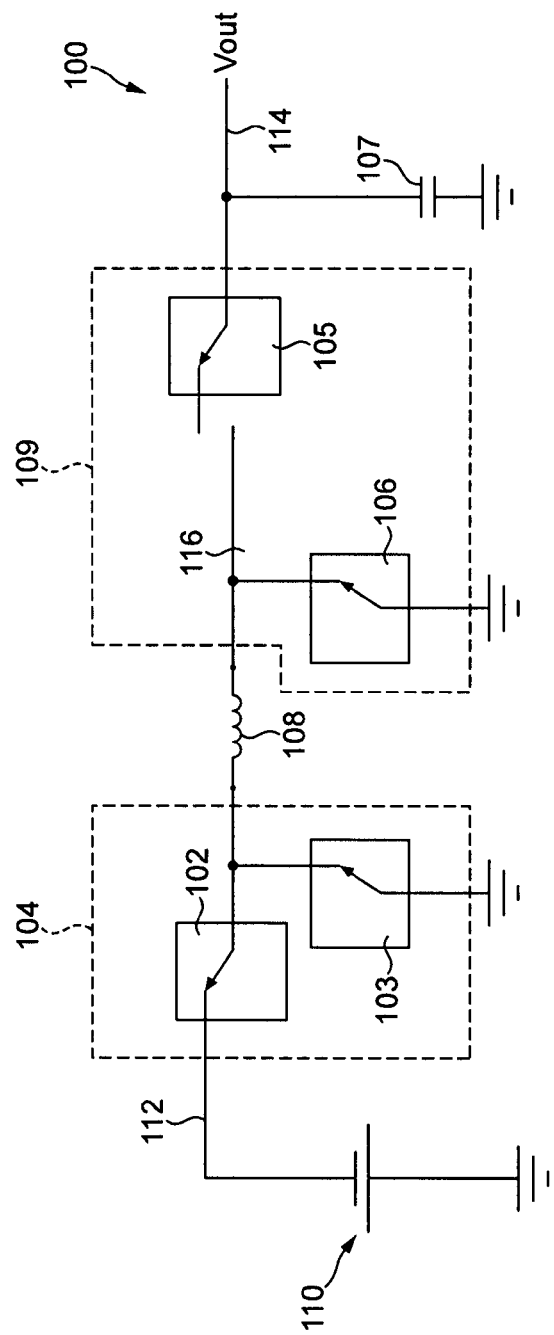
FIG. 1 illustrates a buck-boost converter as known in the prior art.

The present invention is now described by way of example with reference to exemplary embodiments. One skilled in the art will appreciate that embodiments are described for ease of understanding the invention, and the invention is not limited to details of any embodiment described. The scope of the invention is defined by the appended claims.

In the following description where the same reference numerals are used in different Figures, they denote an element in one Figure which corresponds to an element in another Figure.

Figure 2:
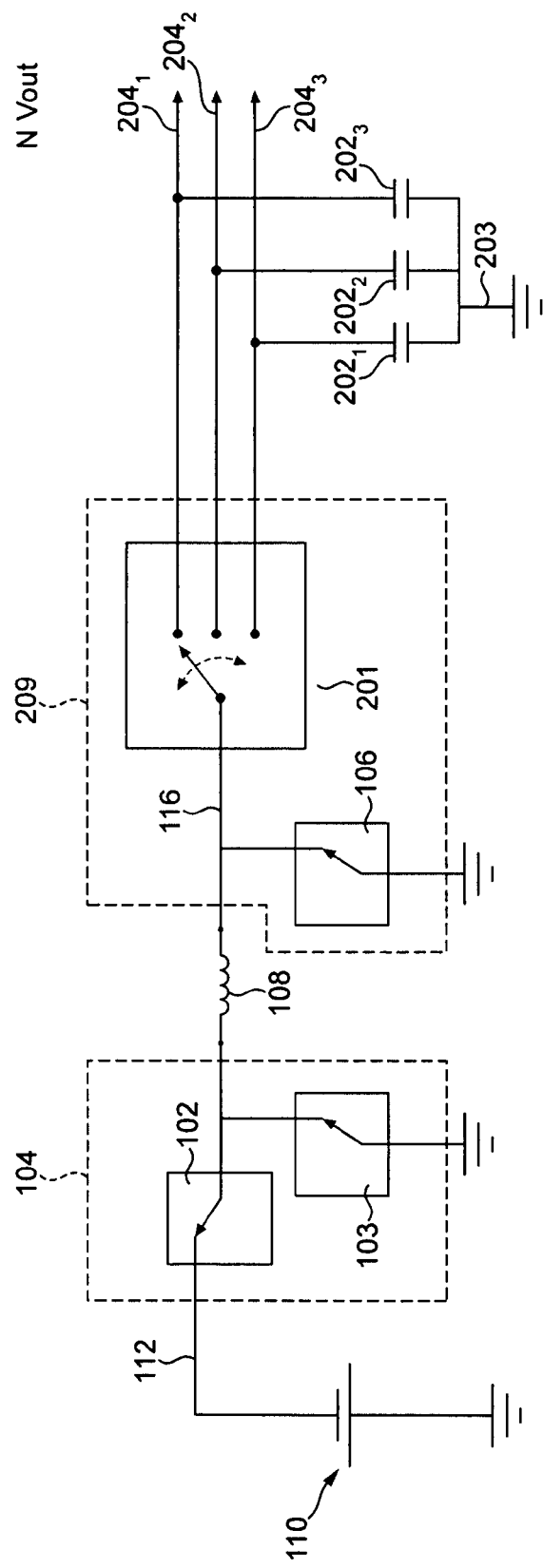
FIG. 2 illustrates a buck-boost converter which may be controlled in accordance with embodiments of the invention.

With reference to FIG. 2, there is illustrated an exemplary voltage supply stage to be controlled. The voltage supply stage provides an assembly of switches and capacitors in combination with a single inductor to generate a plurality of supply voltages from a single voltage source.

With reference to FIG. 2, the power supply stage includes a buck switch stage 104 including switches 102 and 103, and a boost switch stage 209. The boost switch stage includes the switch 106 and a switch array 201. The inductor 108 of FIG. 1 is provided. The capacitor 107 of FIG. 1 is replaced, in general, by a plurality p of capacitors. In the illustrated example p=3, and the plurality of capacitors are denoted by reference numerals $202_1$ to $202_3$. The switch array 201 connects the signal on line 116 at its input to one of three output lines denoted by reference numerals $204_1$ to $204_3$. In general, there are p output lines. Each of the capacitors $202_1$ to $202_3$ is connected between a respective one of the output lines $204_1$ to $204_3$ at a first terminal and ground at a second terminal, the connection to ground being provided on line 203.

The three switches 102, 103, 106 and inductor 108 correspond to the switches of the conventional buck-boost arrangement of FIG. 1. The switch 102 selectively connects the voltage supply (battery 110) to a first terminal of the inductor 108. The switch 103 selectively connects the first terminal of the inductor 108 to ground. The switch 106 selectively connects the second terminal of the inductor 108 to ground.

Switch array 201 replaces switch 105 of FIG. 1 as noted above. Switch array 201 is controlled to connect, at any one time, the first terminal of one of the capacitors $202_1$ to $202_3$ to the second terminal of inductor 108 on line 116.

The inductance of inductor 108 allows current to flow regardless of which of capacitors $202_1$ to $202_3$ is connected. When switch 201 is disconnected from a supply, the relevant supply capacitor will allow current to flow into a respective load (not shown) connected to the respective output line $204_1$ to $204_3$.

The longer any one of the capacitors $202_1$ to $202_3$ is connected to the inductor 108, the higher the respective supply voltage on the respective output voltage line $204_1$ to $204_3$ will climb. Therefore, there is provided scope for regulation of each individual supply on lines $204_1$ to $204_3$.

In practice, a decision as to whether a PWM cycle is to be a buck or boost cycle may be taken at the beginning of the cycle after sampling the inductor current. If the sampled inductor current is greater than the target current (as set by the voltage control), then the cycle is set to be a buck cycle. If the sampled inductor current is less than the target current, then the cycle becomes a boost cycle. One skilled in the art will be familiar with the principles, and exemplary techniques, for determining the enabling of a buck or boost cycle. An exemplary technique is described herein for the determination of boost or buck mode at the start of a cycle, but one skilled in the art will appreciate that other techniques may be used.

In boost mode, each PWM cycle starts with a precharge operation. In a precharge operation all switches of the switch array 201 are open, and switch 106 is closed. The length of the precharge period is implementation dependent. The function of the precharge period is to precharge the inductor 108. Once the precharge period is complete, for the remainder of the PWM boost cycle the switches 201 are controlled in accordance with exemplary arrangements of the invention as described hereinafter. After the precharge period, for the remainder of the PWM boost cycle the switch 106 is open. Throughout the PWM cycle in boost mode, switch 102 is continuously 'on' and switch 103 continuously 'off'. Thus the buck switches 104 are connected such that the battery 110 is connected to the first terminal of the inductor 108 during a boost cycle.

Throughout the PWM cycle in buck mode, the switch 106 is continuously open. The switches 102 and 103 are controlled in accordance with the switching of the switch array 201 as in the boost (following precharge) mode.

It should further be noted that the arrangement of FIG. 2 in which each capacitor is connected between an output line (or output voltage) and ground is exemplary. In an alternative, for example, each capacitor may be connected between an upper voltage level and a lower voltage level. In one arrangement, each capacitor may be connected between an upper voltage level and an adjacent lower voltage level, with one capacitor connected between the lowest voltage level and ground.

Thus, with reference to FIG. 2, in an alternative: capacitor $202_3$ may be connected between lines $204_3$ and $204_2$; capacitor $202_2$ may be connected between lines $204_2$ and $204_1$; capacitor $202_1$ may be connected between lines $204_1$ and electrical ground.

Figure 3:
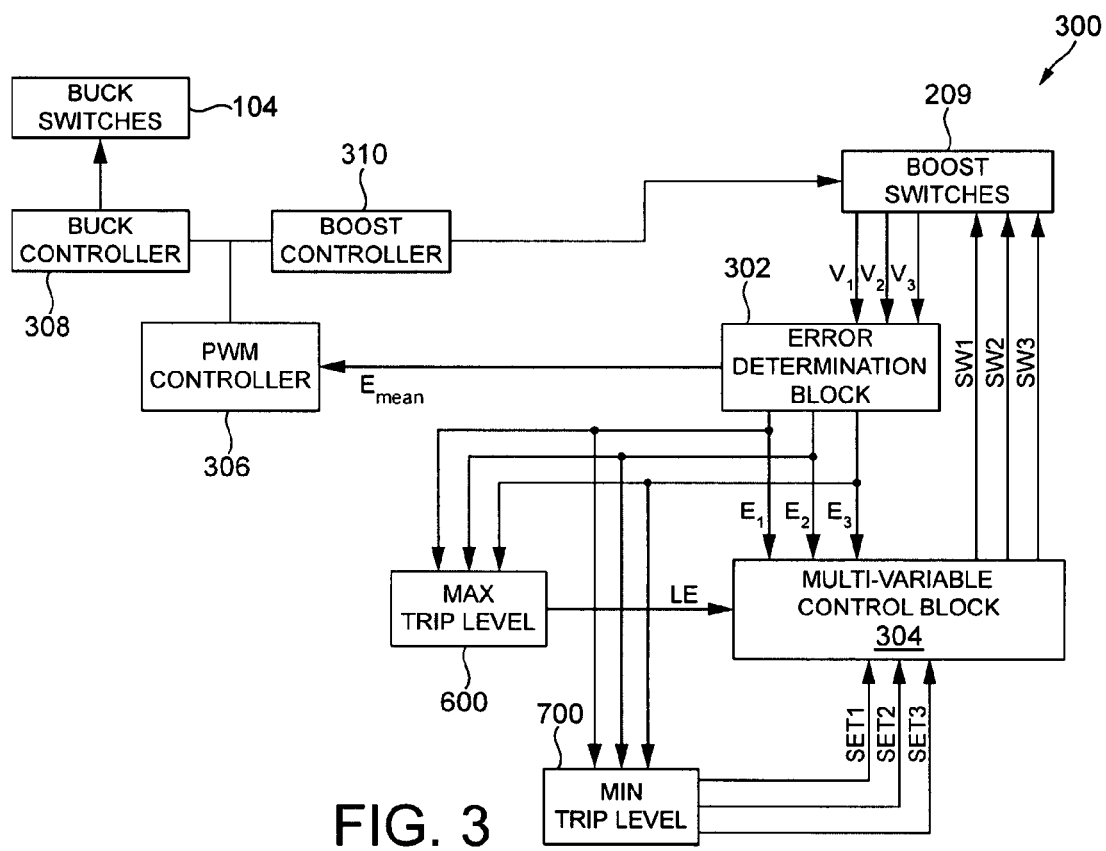
FIG. 3 illustrates an exemplary control architecture for the buck-boost converter of FIG. 2.

With reference to FIG. 3 there is shown the overall control architecture 300 for the generation of the multi-level supply. The control architecture 300 comprises an error determination block 302, a multi-variable control block 304, a maximum trip level control block 600, a minimum trip level control block 700, a PWM controller 306, a buck switch controller block 308 and a boost switch controller block 310.

The error determination block 302, the multi-variable control block 304, the maximum trip level control block 600, and the minimum trip level control block 700 in combination provide an exemplary inner control loop, or first control loop, for the buck-boost converter. The PWM controller 306 provides an exemplary outer control loop, or second control loop, for the buck-boost converter.

The outer control loop of the control architecture 300 provides, in essence, the same overall functionality as a conventional buck-boost controller for determining whether buck or boost mode is to be implemented, and for controlling inductor current.

The voltage error feedback of a conventional buck-boost arrangement, used to determine buck or boost mode, is replaced in the described embodiment with an average error ($E_{mean}$) feedback from the error determination block 302, the generation of which is discussed further hereinbelow. The average error is used by the PWM controller to determine whether a buck or boost mode is entered.

In known buck-boost converters, where a single output voltage is generated, a control function selects either a buck or boost operation in dependence on the voltage error feedback, to drive this voltage error toward zero. In a prior art multi-voltage arrangement multiple buck-boost converters are provided, each having its own control function based on voltage error feedback.

However, in the arrangement as illustrated in FIGS. 2 and 3, this prior art technique for determining buck or boost mode cannot be used, as there are multiple output voltages. With an n-level supply, there are n output voltages that would need to satisfy the requirement to have their voltage error adjusted toward zero.

The error determination block 302 ensures that the n output voltage errors for n output voltages are reduced to a single non-identical value at each output voltage node. This is achieved by determining the mean (or average) error and ensuring the voltage on the output capacitors drive this mean error voltage toward zero. In theory there is no restriction on the number of output voltages that can be accommodated.

As mentioned above, the outer control loop is also used for controlling the inductor current. Without such control, if the battery voltage is high and the buck-boost converter is continually in buck mode, there is no means to control the mean error and all the output voltages would simultaneously drift upwards. To avoid this the outer control loop controls the inductor current by altering the duration of the buck discharge or boost precharge.

Figure 4:
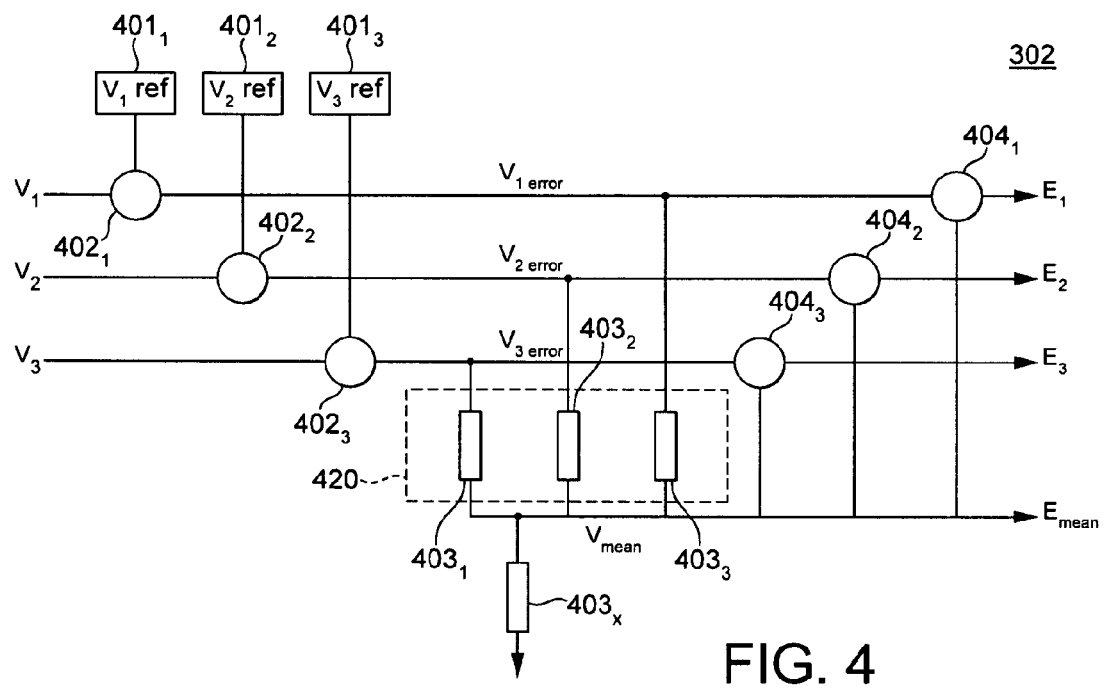
FIG. 4 illustrates an exemplary implementation of an error determination block of FIG. 3.

With reference to FIG. 4, there is illustrated an implementation of the error determination block 302 of FIG. 3, for deriving error voltages from the actual power rail voltages, and for deriving the average (or mean) error.

As noted above the exemplary arrangements shown and described illustrate three supply levels and three power rails for clarity, but the same control scheme can be applied in general to any number n.

The three voltages $V_1$, $V_2$, and $V_3$ on output lines $204_1$, $204_2$, and $204_3$ are applied to respective first inputs of three subtraction means $402_1$, $402_2$, $402_3$. A second input to each subtraction means $402_1$, $402_2$, $402_3$ are respective reference voltages locally derived from respective reference sources 4011, 4012, and 4013. The respective reference voltages are denoted $V_{1ref}$, $V_{2ref}$, and $V_{3ref}$. The reference sources are preferably obtained from an accurate band gap reference.

The reference voltages $V_{1ref}$, $V_{2ref}$, and $V_{3ref}$ are subtracted from the actual output voltages $V_1$, $V_2$ and $V_3$ on output lines $204_1$, $204_2$, and $204_3$ to produce error voltages $V_{1error}$, $V_{2error}$, and $V_{3error}$. These error voltages represent absolute errors of each voltage level.

The voltages $V_{1error}$, $V_{2error}$, and $V_{3error}$ are converted to a mean error value and a plurality of error deviation values. The mean error represents the average or mean of the error voltages $V_{1error}$, $V_{2error}$ and $V_{3error}$. The plurality of error deviation values represent the value of the deviation of each error voltage $V_{1error}$, $V_{2error}$ and $V_{3error}$ from the mean error.

The mean is obtained by applying the error voltages $V_{1error}$, $V_{2error}$, and $V_{3error}$ to an averaging means 420. The averaging means 420 may, for example, be provided by a network of resistors $403_1$, $403_2$, $403_3$. The network of resistors are connected such that a first terminal of each resistor $403_1$, $403_2$, $403_3$ is connected to a respective one of the output lines $204_1$, $204_2$, and $204_3$. A second terminal of each of the resistors $403_1$, $403_2$, $403_3$ is connected to a common node to which a first terminal of a resistor 403X is connected. The second terminal of the resistor 403X is connected to ground. The mean error is denoted by $E_{mean}$, and is formed at the common node.

The error voltages $V_{1error}$, $V_{2error}$, and $V_{3error}$ are applied as first inputs to respective further subtraction means $404_1$, $404_2$, $404_3$, for subtraction from the mean error $E_{mean}$. The mean error $E_{mean}$ is provided as a second input to each of the subtraction means $404_1$, $404_2$, $404_3$. The subtraction means $404_1$, $404_2$, $404_3$ provide respective error deviation values $E_1$, $E_2$, $E_3$, associated with the respective output voltages $V_1$, $V_2$ and $V_3$. These error deviation values $E_1$, $E_2$, $E_3$ form the inputs to the multi-variable control block 304.

Figure 5:
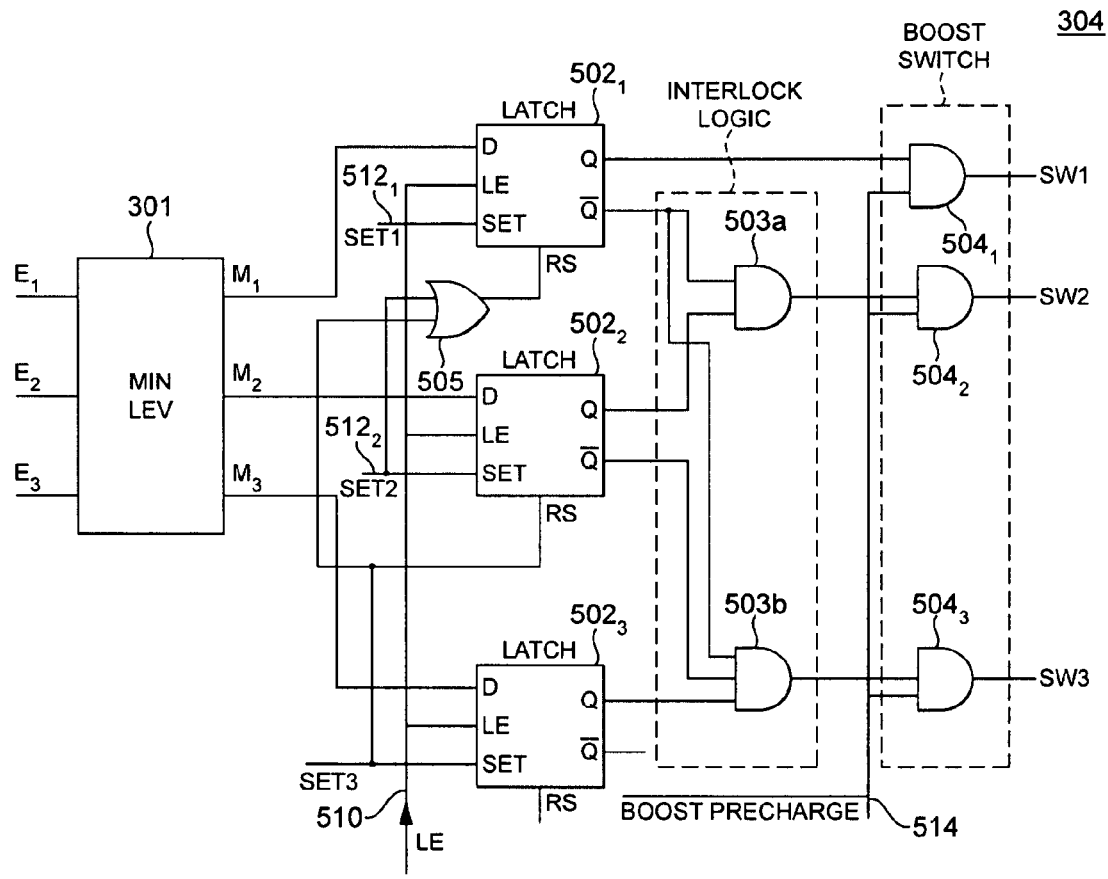
FIG. 5 illustrates an exemplary implementation of a multi-variable control block of FIG. 3.

With reference to FIG. 5 there is illustrated an implementation of the multi-variable control block 304. The multi-variable control block 304 includes a minimum level detector 501; three latches $502_1$, $502_2$, and $502_3$; an OR gate 505; a pair of AND gates 503a and 503b; and three output AND gates $504_1$, $504_2$, and $504_3$.

In general the number of latches 502 and the number of output AND gates 504 corresponds to the number of output voltages, so in theory there may be provided n latches and n output AND gates. Each output AND gate has an output which controls one of the switches of the switch array 201. The operation of the multi-variable control loop 304 is now further described.

The input error deviation values $E_1$, $E_2$, $E_3$ are applied as inputs to the minimum level detector 501. The minimum level detector 501 outputs three digital flag signals $M_1$, $M_2$, $M_3$, which correspond respectively to the input error deviation values $E_1$, $E_2$, $E_3$. The minimum level detector detects the error deviation value which is most negative, i.e. which has the largest error (not the closest to zero). The flag associated with the error deviation value having the most negative error is then set by the minimum level detector 501, and the other flags are not set.

The flag signals $M_1$, $M_2$, $M_3$ are used to control a state machine around the latches 502 that in turn controls which one of the switches 201 is operational at any instant.

Each latch has a data input (D), a latch enable input (LE), a set input (SET), a reset input (RS), an output (Q) and an inverse output (Qbar). Each of the data inputs of latches $502_1$, $502_2$, and $502_3$ is connected to receive a respective flag $M_1$, $M_2$, and $M_3$. Each of the latch enable inputs of latches $502_1$, $502_2$, and $502_3$ is connected to receive latch enable signal LE-on line 510. Each of the set inputs of latches $502_1$, $502_2$, and $502_3$ is connected to receive a respective set input SET1, SET2, SET3 on lines $512_1$, $512_2$, and $512_3$. The reset input of the third latch $502_3$ is not connected. The reset input of the second latch $502_2$ is connected to the set signal SET3 on line $512_3$. The reset input of the first latch $502_1$ is connected to the output of the OR gate 505, which receives as its inputs the set signal SET3 on line $512_3$ and the set signal SET2 on line $512_2$. The output of the first latch $502_1$ forms a first input to the AND gate $504_1$. The output of the second latch $502_2$ forms a first input to the AND gate 503a. The output of the third latch $502_3$ forms a first input to the AND gate $504_b$. The inverse output of the first latch $502_1$ forms a second input to the AND gate $503_a$, and second input to the AND gate 503b. The inverse output of the second latch $502_2$ forms a third input to the AND gate 503b. The inverse output of the third latch $502_3$ is not connected. The outputs of each of the AND gates 503a and 503b form first inputs to the AND gates $504_2$ and $504_3$. A boost precharge control signal on line 514 forms a second input to each of the AND gates $504_1$, $504_2$, and $504_3$.

As mentioned above, the multi-variable control block 304 receives as inputs the error deviation values $E_1$, $E_2$, $E_3$; the latch enable input LE; the set inputs SET1, SET2, SET3; and the boost precharge input. The multi-variable control block 304 generates the control signals to control the switches of the switch array 201, which signals are denoted SW1, SW2, SW3 in FIG. 5.

In general, the registers 502 latch the values of the flags M. The AND gates 503 operate to ensure that only one latched Output is delivered to the switches at any one time.

The AND gates 504 allow the outputs of the latches to be disabled from the switch controls during a boost precharge cycle. Thus irrespective of the output of any latch, when a boost precharge cycle is in operation the signal on line 514 is set to ensure that the outputs of all the output AND gates 504 are low, and that all output switches of the switch array 201 are open. When a boost precharge operation is not enabled, the output AND gates 504 simply propagate the signal at their other input to their output.

An interlock mechanism is provided by AND gates 503, to ensure that only one of the switches of the switch array 201 is operational even if the data output of more than one of latches 502 is high at any time. In the event that more than one latch 502 is high, preferably only the lowest of the latches which is high is operational, and higher levels are disengaged from the output. As can be seen from FIG. 5, the output signals to control each of the respective switches (in the example three switches) of the output array are provided by the data outputs of the three respective latches. The output for the lowest latch $502_1$ is delivered directly to the output AND gate $504_1$, and therefore when this output is high the respective switch will always be enabled (assuming that boost precharge is not taking place). The data outputs of the other latches are delivered to their respective output AND gates 504 via AND gates 503, to ensure that if the output of a particular latch is set high it is not delivered to its associated output AND gate if the output of any lower latch is also set high.

At startup, the flag M associated with the lowest (most negative) error deviation value is set, and the flags latched into the respective latches 502 when the latches are enabled by the control signal LE on line 510. Only one latch will have a high value latched therein, as only one flag is set, and therefore the data output of only one latch is set high.

The setting and latching of the flag associated with the most negative error deviation value ensures that the output capacitor 202 with the most negative error deviation value is charged from the switched mode inductor 108. The capacitance continues to be charged, with the result that the error deviation value gets smaller and ideally changes sign as the power supply output voltage rises.

Figure 6:
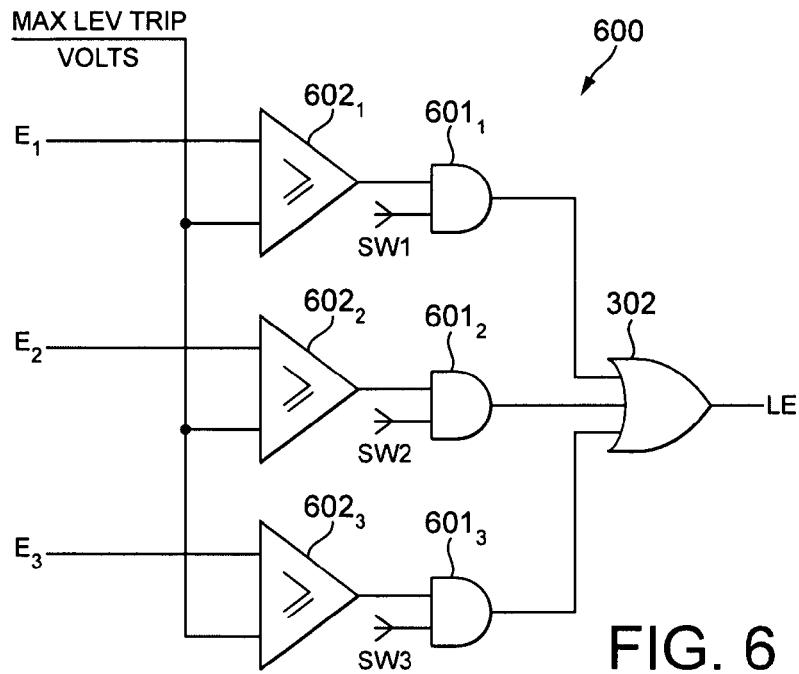
FIG. 6 illustrates an exemplary implementation of a maximum trip level detector block of FIG. 3.

The charging of any capacitor is monitored by, and as appropriate terminated by the maximum volts trip circuit 600, an exemplary implementation of which is illustrated in detail in FIG. 6. The error deviation values $E_1$, $E_2$, $E_3$ are applied as respective first inputs to comparators $602_1$, $602_2$, $602_3$. Second inputs to the comparators are provided by a common reference signal. Each comparator operates to detect whether a trip voltage set by the common reference signal has been exceeded. The output of each comparator $602_1$, $602_2$, $602_3$ is provided to a respective first input of a respective AND gate $601_1$, $601_2$, $601_3$. The second input to each of the AND gates is provided by the respective switch outputs SW1, SW2, SW3 of the multi-variable control block 304 (from AND gates 504). This ensures that only the comparator output associated with the capacitor currently being charged is delivered at the outputs of the respective AND gates 601, i.e. only one of the AND gates 601 is enabled. The outputs of the AND gates $601_1$, $601_2$, $601_3$ are provided as inputs to an OR gate 302, the output of which generates the latch enable signal LE on line 510. Thus once the comparator operation for the capacitor currently being charged indicates that a threshold has been reached, the charging of that capacitor is stopped and the latch enable signal generated to latch in the flags M, so that a next capacitor, having the current highest error deviation value, is charged.

The threshold associated with the trip voltage for detecting a maximum voltage trip, for input to the comparators 602, is implementation dependent.

During the charging process, the voltage across one of the output capacitors 202 may fall below a minimum allowed error deviation value limit, i.e. an error deviation value may become so large as to exceed a threshold. If this happens it is preferably required to promptly charge that capacitor. This is controlled by the minimum voltage trip circuit 700, as illustrated in detail in FIG. 7.

In the minimum voltage trip circuit 700 the error deviation value values $E_1$, $E_2$, $E_3$ are applied as respective first inputs to comparators $702_1$, $702_2$, $702_3$. A second input to each comparator 702 is provided by common reference signal comprising a threshold signal. The outputs of the comparators $702_1$, $702_2$, $702_3$ generate the respective SET signals SET1, SET2, SET3 on lines $512_1$, $512_2$, $152_3$ respectively. Any of the comparators $702_1$, $702_2$, $702_3$ trip when a negative deviation value is below a minimum level trip as defined by the threshold, and the associated SET signal is delivered to the respective latch. Thus when an excessive negative deviation value error is detected, the corresponding latch is set, and all the others latches above are reset. There is no requirement to reset latches at a lower level because they are ignored by the interlock logic. Logic gate 505 of FIG. 5 allows the other necessary latches to be reset when a given latch is set. Setting $502_3$ resets $502_2$ and $502_1$. Setting $502_2$ resets $502_1$.

The threshold associated with the trip voltage for detecting a minimum voltage trip, for input to the comparators 702, is implementation dependent.

Figure 8:
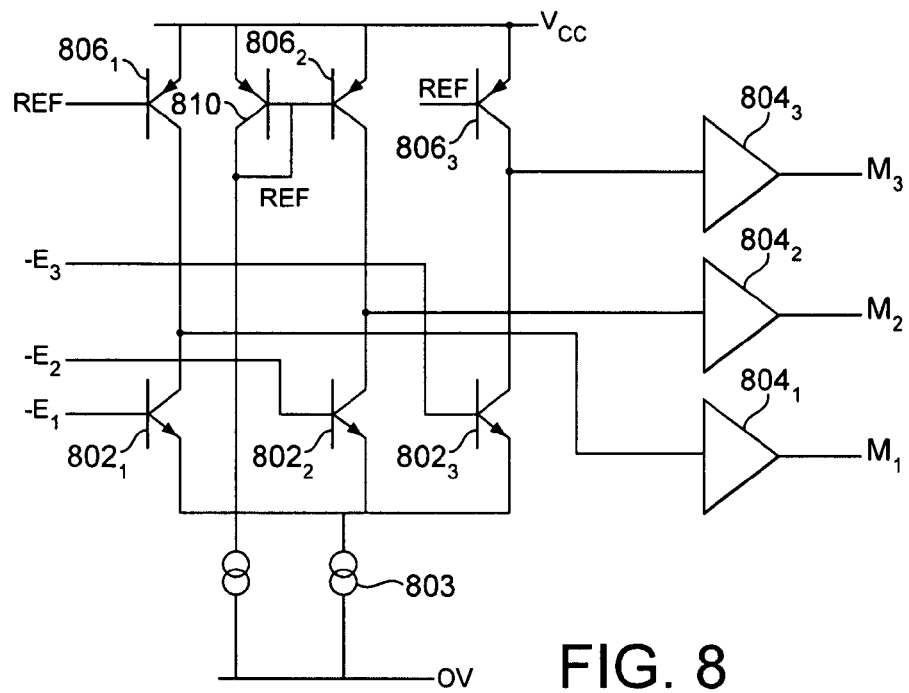
FIG. 8 illustrates an exemplary implementation of a minimum error deviation detector block of the variable multi-variable control block of FIG. 5.

FIG. 8 shows an exemplary implementation of the minimum level detector 501 of FIG. 5. A plurality of transistors $802_1$, $802_2$, $802_3$ are connected to receive at the base terminals thereof the inverse error deviation values $-E_1$, $-E_2$, $-E_3$. The emitter terminals of each of the transistors $802_1$, $802_2$, $802_3$ are connected to a common point. A current source 803 is connected between the common point and ground. The collector terminals of the transistors $802_1$, $802_2$, $802_3$ are connected to collector terminals of a plurality of respective transistors $806_1$, $806_2$, $806_3$. The base terminals of the plurality of transistors $806_1$, $806_2$, $806_3$ are connected to a reference voltage, denoted REF. The emitter terminals of the plurality of transistors $806_1$, $806_2$, $806_3$ are connected to a supply rail carrying the supply voltage Vcc. The common collector connections of each of the transistor pairs $806_1$, $802_1$; $806_2$, $802_2$; and $806_3$, $802_3$ are connected to respective inputs of a respective set of amplifiers $804_1$, $804_2$, $804_3$. Further there is provided a transistor 810 having an emitter terminal connected to the supply rail, a base terminal connected to the base of transistor $806_2$, and a collector terminal connected to its base terminal and to a first terminal of a current source, the other terminal of the current source being connected to ground.

The error deviation values polarity in FIG. 8 is revered compared with the previous Figures, so that the minimum voltage becomes a maximum voltage. This means that the current source 803 is directed through whichever transistor 802 that biases the maximum voltage applied to the base thereof. This will pull down the corresponding output of the transistor 802 and activate the corresponding logic buffer 804. Transistor 810 acts as a load.

Figure 7:
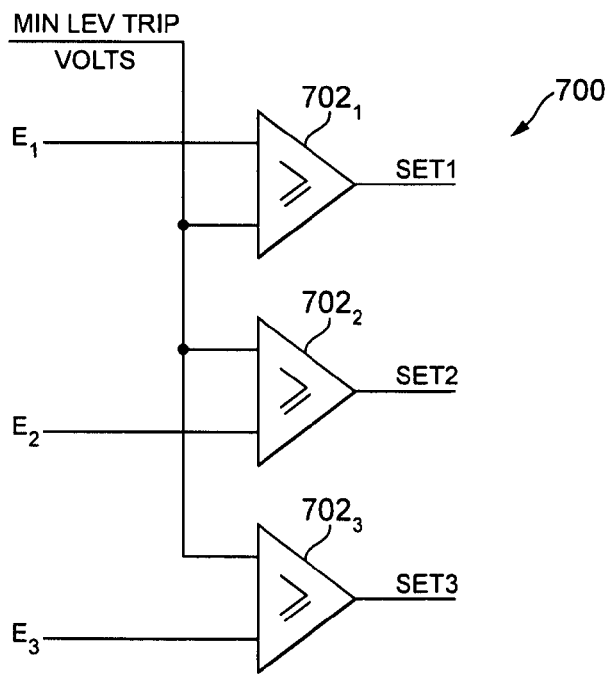
FIG. 7 illustrates an exemplary implementation of a minimum trip level detector block of FIG. 3.

Although the exemplary implementation of FIG. 7 shows BJT transistors, equivalent functional blocks in other technologies may be substituted.

Figure 9:
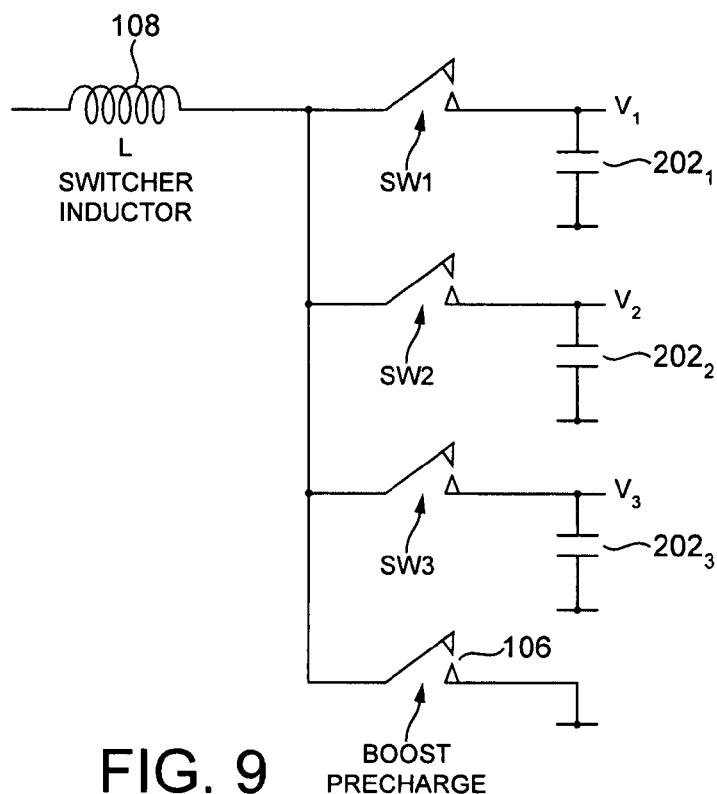
FIG. 9 illustrates the output switch array of the buck-boost converter of FIG. 2.

FIG. 9 shows how the control signals SW1, SW2, SW3 generated by the multi-variable control block interact with the switching devices. The switcher inductor 108 supplies current through the bank of switches 201 into capacitors 202. Control signals SW1, SW2, SW3 from the multi-variable control block control switches $201_1$ to $201_3$ to charge selected output capacitors $202_1$ to $202_3$.

Also shown in FIG. 9 is the switch 106, which is controlled by a boost precharge signal during a boost precharge operation.

It is desirable that the buck-boost converter of FIG. 2 can support discontinuous mode, otherwise the control will be adversely affected with the capacitors being discharged rather than charged. In discontinuous mode, the controller will allow the inductor 108 to be connected to the switched capacitor until conduction restarts, and the switched capacitor can continue to be charged.

The parameters available for operation of the multi-variable control block are the output capacitance of the psu, and the ripple limits. The ripple limit sets the maximum allowable ripple, and the value of capacitor sets the update rate for a given load current. It is desirable to have as large an output capacitor as possible to reduce update rates and therefore switching losses. One desirable feature is that a drop in load current reduces the update rate and therefore the switching losses in accordance with load power.

The invention has been described herein by way of reference to particular examples and embodiments, for the purposes of illustrating the invention and its embodiments. The invention is not limited to the specifics of any embodiment descried herein. Any feature of any embodiment may be implemented in combination with features of other embodiments, no embodiment being exclusive. The scope of the invention is defined by the appended claims.

What is claimed is:

1. A voltage generation apparatus comprising: a voltage source; an inductor, wherein a first terminal of the inductor is switchably connected to the voltage source; and a plurality of capacitors switchably connected to a second terminal of the inductor, wherein a respective plurality of output voltages are formed across the plurality of capacitors, further comprising:

an error determination block which determines an error in each of the plurality of voltages, a mean error in dependence thereon, and an error deviation from the mean error for each of the plurality of output voltages; and a controller for switchably connecting one of the plurality of capacitors to the second terminal of the inductor in dependence on the plurality of error deviations.

2. The voltage generation apparatus according to claim 1 wherein the controller is adapted to switchably connect the capacitor associated with the one of the plurality of output voltages having the most negative deviation from a mean error.

3. A buck-boost converter including the voltage generation circuit according to claim 1, and further including a controller adapted to control the converter to switch between buck and boost operation in dependence on a mean error of the plurality of output voltages formed across the plurality of capacitors.

4. The voltage generation apparatus according to claim 1 wherein the controller is adapted to ensure that only one of the plurality of capacitors is connected to the second terminal of the inductor at any time.

5. The voltage generation apparatus according to claim 4 wherein the controller includes logic to generate a plurality of control signals for a switch array for switchably connecting each of the plurality of capacitors to the second terminal of the inductor, wherein if more than one of said control signals is set the control signal for the switch associated with the lowest output voltage is delivered to the switch array.

6. The voltage generation apparatus according to claim 1 further comprising a detector for detecting a maximum voltage has been reached for a switchably connected capacitor, and responsive thereto for disconnecting the capacitor.

7. The voltage generation circuit according to claim 1 further comprising a monitor for monitoring all the capacitors which are not switchably connected, wherein on detection of a voltage associated with any capacitor falling below a minimum allowed error deviation, switchably connecting that capacitor.

8. A buck-boost converter comprising a voltage generation apparatus according to claim 1 further comprising:

an inner control loop adapted to switchably connect one of the plurality of capacitors to the second terminal of the inductor in dependence on the plurality of error deviations; and an outer control loop adapted to control switching between buck mode and boost mode in dependence upon the determined errors.

9. The buck-boost converter according to claim 8 further comprising a monitor for monitoring all the capacitors which are not switchably connected, and adapted, on detection of a voltage associated with any capacitor falling below a minimum allowed error deviation, to switchably connect that capacitor.

10. The buck-boost converter according to claim 8 wherein the inner control loop is adapted to operate in dependence on the plurality of error deviations and the outer control loop is adapted to operate in dependence upon the mean error.

11. The buck-boost converter according to claim 10 wherein the inner control loop is adapted to connect the one of the plurality of capacitors associated with the output voltage having the largest error deviation.

12. The buck-boost converter according to claim 8 further comprising a detector for detecting a maximum voltage has been reached for a switchably connected capacitor, and responsive thereto for disconnecting the capacitor.

13. A method for controlling a voltage generation apparatus comprising: a voltage source; an inductor, wherein a first terminal of the inductor is switchably connected to the voltage source; and a plurality of capacitors switchably connected to a second terminal of the inductor, wherein a respective plurality of output voltages are formed across the plurality of capacitors, the method comprising:

determining an error in each of the plurality of voltages, a mean error in dependence thereon, and an error deviation from the mean error for each of the plurality of voltages; and switchably connecting one of the plurality of capacitors to the second terminal of the inductor in dependence on the error deviations.

14. A method for controlling a buck-boost converter including the steps of controlling a voltage generation circuit according to claim 13, and further including controlling the converter to switch between buck and boost operation in dependence on a mean error of the plurality of output voltages formed across the plurality of capacitors.

15. The method according to claim 13 wherein the step of switchably connecting is adapted to switchably connect the capacitor associated with the one of the plurality of output voltages having the most negative deviation from a mean error.

16. A method for controlling a buck-boost converter comprising: a voltage source; an inductor, wherein a first terminal of the inductor is switchably connected to the voltage source; and a plurality of capacitors switchably connected to a second terminal of the inductor, wherein a respective plurality of output voltages are formed across the plurality of capacitors, the method comprising:

determining an error in each of the plurality of voltages, a mean error in dependence thereon, and an error deviation from the mean error for each of the plurality of voltages;

switchably connecting one of the plurality of capacitors to the second terminal of the inductor in dependence on the error deviations; and switching between buck mode and boost mode in dependence upon the mean error.

17. The method according to claim 16 further comprising determining an error deviation for each of the plurality of output voltages and a mean error for the plurality of output voltages, and operating an inner control loop in dependence on the plurality of error deviations and operating an outer control loop in dependence upon the mean error.

18. The method according to claim 17 wherein the inner control loop is adapted to connect the one of the plurality of capacitors associated with the output voltage having the largest error deviation.

* * * * *